US009862097B2

(12) United States Patent
Melikian et al.

(10) Patent No.: US 9,862,097 B2
(45) Date of Patent: Jan. 9, 2018

(54) INDUSTRIAL ROBOT SYSTEM HAVING SENSOR ASSEMBLY

(71) Applicants: RECOGNITION ROBOTICS, INC., Elryia, OH (US); ZAGAR INC., Cleveland, OH (US)

(72) Inventors: Simon Melikian, Westlake, OH (US); Jeremy Hughes, Lakewood, OH (US); Brian Zagar, Cleveland, OH (US)

(73) Assignees: Recognition Robotics, Inc., Elyria, OH (US); Zagar Inc., Cleveland, OH (US)

( * ) Notice: Subject to any disclaimer, the term of this patent is extended or adjusted under 35 U.S.C. 154(b) by 392 days.

(21) Appl. No.: 14/736,343

(22) Filed: Jun. 11, 2015

(65) Prior Publication Data
US 2015/0273694 A1 Oct. 1, 2015

Related U.S. Application Data

(62) Division of application No. 13/673,256, filed on Nov. 9, 2012, now Pat. No. 9,086,271.

(51) Int. Cl.
| | |
|---|---|
| G06F 19/00 | (2011.01) |
| B25J 9/16 | (2006.01) |
| G01B 11/14 | (2006.01) |
| B25J 11/00 | (2006.01) |
| B25J 19/02 | (2006.01) |

(Continued)

(52) U.S. Cl.
CPC ........... B25J 9/1697 (2013.01); B23B 49/00 (2013.01); B25J 11/005 (2013.01); B25J 19/022 (2013.01); G01B 11/14 (2013.01); G05B 19/0405 (2013.01); G05B 2219/45059 (2013.01);

(Continued)

(58) Field of Classification Search
CPC ....... G05D 15/00; G01B 11/14; Y10S 901/41; Y10S 901/47
See application file for complete search history.

(56) References Cited

U.S. PATENT DOCUMENTS

| | | | |
|---|---|---|---|
| 4,611,377 A | 9/1986 | McCormick et al. | |
| 6,301,997 B1 * | 10/2001 | Welte | B25B 21/00 33/263 |

(Continued)

OTHER PUBLICATIONS

Zhang, W. J., et al. "Automatic optical defect inspection and dimension measurement of drill bit." Mechatronics and Automation, Proceedings of the 2006 IEEE International Conference on. IEEE, 2006.*

(Continued)

Primary Examiner — Michael D Masinick
(74) Attorney, Agent, or Firm — Rankin, Hill & Clark LLP

(57) ABSTRACT

An industrial robot system includes an end effector connectable to a robot arm, a drive assembly, and a controller. The end effector includes a distal housing, a spindle assembly rotatable about a rotational axis, a drill bit rotatable about the rotational axis, and a sensor assembly. The sensor assembly includes a first light source, a second light source, and a photosensitive array. The first light source produces a first fan of light which is projected as a first line of light on the object surface. The second light source produces a second fan of light, which is projected as a second line of light on the object surface. The photosensitive array detects a first reflection line corresponding to the first line of light and a second reflection line corresponding to the second line of light.

4 Claims, 4 Drawing Sheets

(51) Int. Cl.
　　　 B23B 49/00　　　(2006.01)
　　　 G05B 19/04　　　(2006.01)
　　　 G05D 15/00　　　(2006.01)
(52) U.S. Cl.
　　　 CPC ............. G05D 15/00 (2013.01); Y10S 901/02 (2013.01); Y10S 901/41 (2013.01); Y10S 901/47 (2013.01)

(56)　　　　　　　　References Cited

U.S. PATENT DOCUMENTS

| | | |
|---|---|---|
| 6,813,843 B1 | 11/2004 | Faubion |
| 6,953,926 B2 | 10/2005 | Reime |
| 8,320,612 B2 | 11/2012 | Knobel et al. |
| 8,378,288 B2 | 2/2013 | Kiyose |
| 8,542,350 B2 | 9/2013 | Nakanishi |
| 8,576,412 B2 | 11/2013 | Nakanishi |
| 2001/0052581 A1 | 12/2001 | Bohn |
| 2005/0094136 A1* | 5/2005 | Xu .................... G01N 21/21 356/237.3 |
| 2006/0101960 A1* | 5/2006 | Smith ................ B23D 59/001 83/58 |
| 2006/0104734 A1 | 5/2006 | Mathis et al. |

OTHER PUBLICATIONS

Bejczy, A.K., et al.; "Impact of End Effector Technology on Telemanipulation Performance", Jet Propulsion Laboratory, California Institute of Technology, Pasadena, California.
Patio, Paul Ciprian, et al; "Electronics and informatics solution in mobile robot orientation", International Journal of Systems Applications, Engineering & Development Issue 3, vol. 5, 2011.

* cited by examiner

INDUSTRIAL ROBOT SYSTEM HAVING SENSOR ASSEMBLY

BACKGROUND

Industrial robots are used to position and support tools for operation on large work pieces. Conventional robots have limitations on the accuracy to position and hold a tool with respect to the work piece.

SUMMARY

An example of an industrial robot system having an increased accuracy in positioning a tool with respect to a work piece includes an end effector connectable to a robot arm, a drive assembly operatively connected with the robot arm, and a controller in electrical communication with the drive assembly. The end effector includes a distal housing, a spindle assembly connected with the distal housing and rotatable about a rotational axis, a drill bit connected with the spindle assembly and rotatable about the rotational axis, and a sensor assembly mounted to the distal housing offset from the rotational axis. The drive assembly, which is operatively connected with the robot arm, moves the robot arm to locate the drill bit in the desirable location. The controller is in electrical communication with the sensor assembly and the drive assembly and is configured to transmit signals to the drive assembly to move the robot arm to adjust the rotational axis of the drill bit with respect to an object surface of the work piece.

The sensor assembly mounted to the distal housing of the end effector includes a first light source offset from the rotational axis, a second light source offset from the rotational axis and the first light source, and a photosensitive array offset from the rotational axis, the first light source, and the second light source. The first light source is configured to produce a first fan of light which is projected as a first line of light on the object surface. The second light source is configured to produce a second fan of light, which is projected as a second line of light on the object surface. The second fan of light resides in a second plane, which is offset at an angle transverse to a first plane in which the first fan of light resides. The photosensitive array is positioned with respect to the first light source and the second light source to detect a first reflection line corresponding to the first line of light and a second reflection line corresponding to the second line of light.

A method for controlling an industrial robot includes moving a point on a robot arm adjacent to a nominal location within a robot frame. The method further includes determining x, y and z-coordinates, and $R_x$ and $R_y$ of the point on the robot arm with respect to an x-y plane defined by an object surface and a z-axis normal to the x-y plane. The robot arm includes a drill bit rotatable about a rotational axis. $R_x$ is an angle between the rotational axis and the z-axis in an x-direction. $R_y$ is an angle between the rotational axis and the z-axis in a y-direction.

Determining the x, y and z-coordinates and the $R_x$ and $R_y$ of the point on the robot arm further includes projecting a first line of light from a first light source onto the object surface, projecting a second line of light from a second light source, which is offset from the first light source, onto the object surface, detecting a reflection of the first line of light on a photosensitive array to generate a first reflection line, detecting a reflection of the second line of light on the photosensitive array to generate a second reflection line, and calculating the x, y and z-coordinates, and $R_x$ and $R_y$ of the point on the robot arm. Both the first line of light and the second line of light are projected from each respective light source onto the object surface without moving the point on the robot arm from adjacent the nominal location. The second line of light intersects the first line of light at an intersection point on the object plane where the rotational axis intersects the object plane. The photosensitive array is offset from the first light source and the second light source. Calculating the x, y and z-coordinates and $R_x$ and $R_y$ of the point on the robot arm is based on the intersection point and an angle between the first reflection line and the second reflection line.

DETAILED DESCRIPTION

Figure 1:
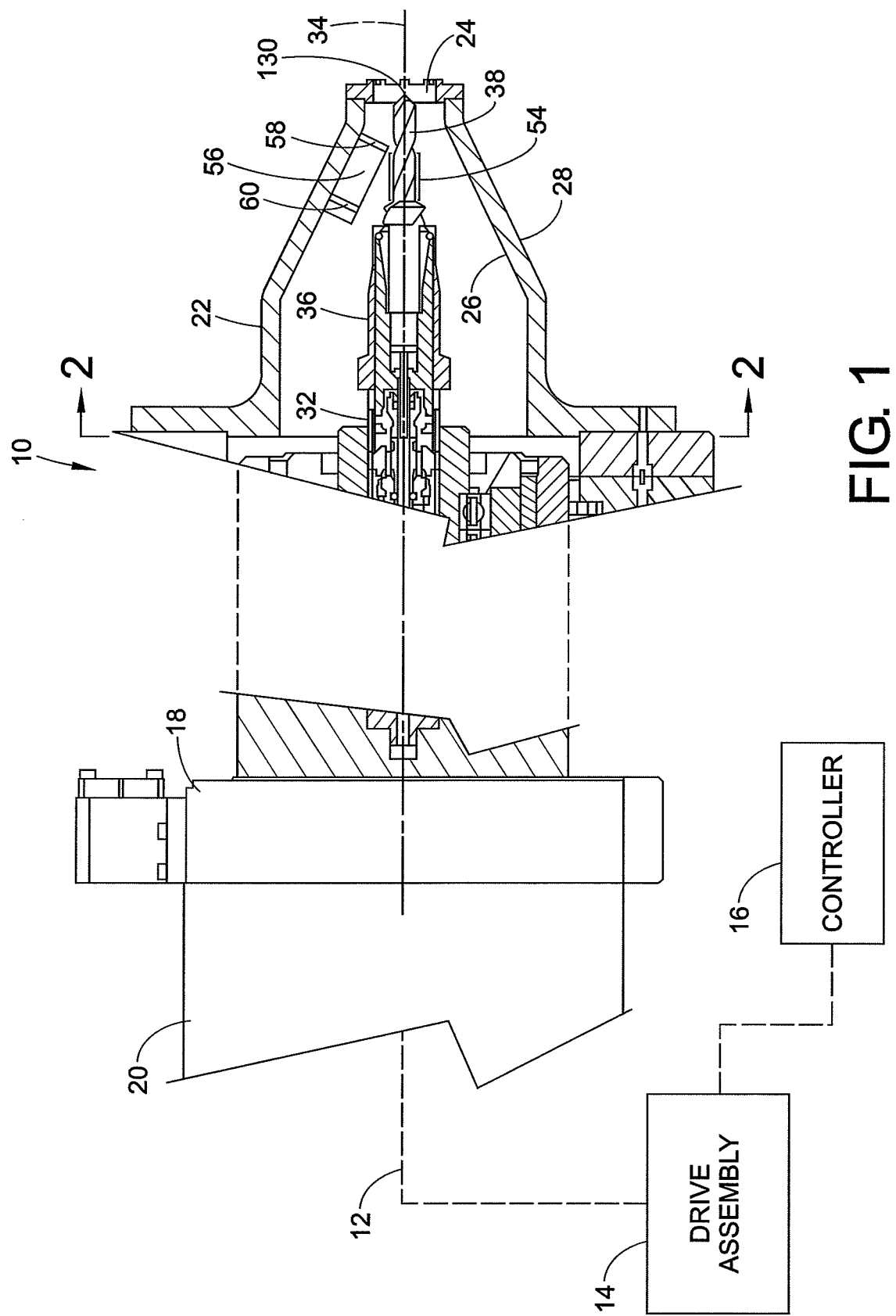
FIG. 1 is a longitudinal schematic partial cross-sectional view of an end effector connected to a robot arm of an industrial robot.

FIG. 1 depicts an industrial robot system including an end effector 10 connectable to a robot arm 12 (schematically depicted in FIG. 1) of an industrial robot such as one manufactured by KUKA Roboter GmbH. The robot system further includes a drive assembly 14 and a controller 16, each of which are only schematically depicted in FIG. 1. The controller 16 is in electrical communication with the drive assembly 14. The drive assembly 14, which can be similar to drive assemblies that are known in the art, is operatively connected with the robot arm 12 in a conventional manner for moving the robot arm 12 throughout the robot frame. The controller 16 transmits signals to the drive assembly 14 to move the robot arm 12 to adjust and to move the robot arm within the robot frame.

The end effector 10 includes a changer tool side 18 that couples the end effector 10 to a complementary master side of a tool changer 20 fixed to an end of the robot arm 12. The changer tool side 18 of the end effector 10 can provide electric signals from the controller 16 to the end effector 10 as well as air pressure and coolant via connections and lines that are not shown. The end effector 10 further includes a distal housing 22. The distal housing 22 is hollow and can be generally cone-shaped and may also be referred to as a nose or cone of the end effector. The distal housing 22 includes a distal opening 24. The distal housing 22 further includes an internal surface 26 and an external surface 28.

The end effector 10 further includes a spindle assembly 32 connected with the distal housing 22 and rotatable about a rotational axis 34. The distal housing 22 is centered with respect to the rotational axis 34 and the distal opening 24 is concentric with the rotational axis 34. The spindle assembly 32 is driven by a motor or other drive assembly, which can be conventional and is, therefore, not shown. The spindle assembly 32 carries an automatic tool clamp 36. Many of the components of the end effector are not shown, and these components can be conventional components and/or components further described in U.S. 2012/0020756 A1, which is incorporated by reference herein.

The end effector 10 further includes a drill bit 38 connected with the spindle assembly 32 and rotatable about the rotational axis 34. As illustrated, the tool clamp 36 couples the drill bit 38 to the spindle assembly 32. The spindle assembly 32 and the drill bit 38 also translates along the rotational axis 34, which allows the drill bit 38 to extend through the distal opening 24 in the distal housing 22 when the drill bit 38 is to operate on a work piece.

Figure 2:
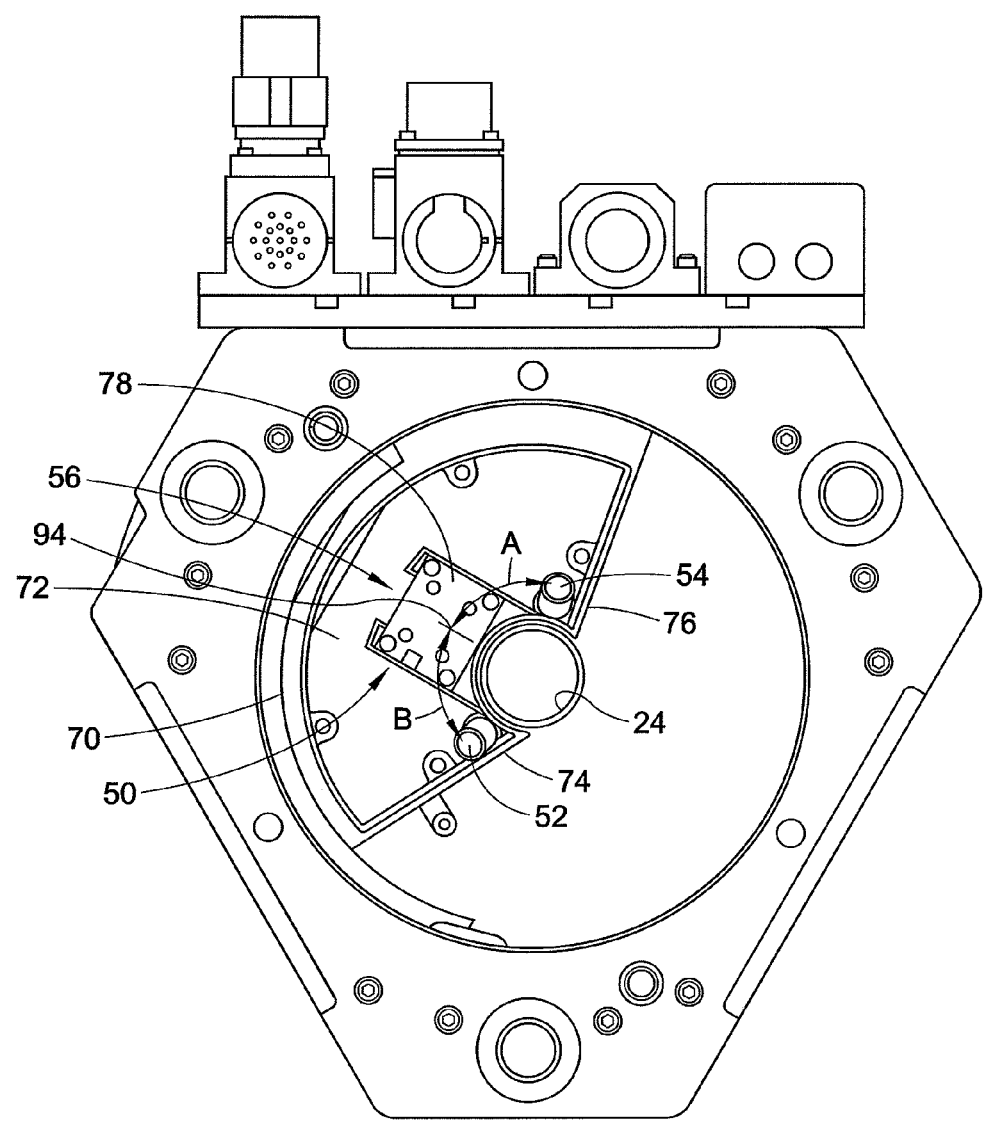
FIG. 2 is a view taken generally along line 2-2 through the end effector depicted in FIG. 1.

With reference to FIGS. 1 and 2, the end effector 10 further includes a sensor assembly 50 mounted to the distal housing 22 offset from the rotational axis 34. As more clearly visible in FIG. 2, the sensor assembly 50 generally includes a first light source 52, a second light source 54, and a camera 56. As more clearly visible in FIG. 1, the camera 56 includes a lens 58 and a photosensitive array 60. FIG. 1 schematically depicts the camera 56 and the second light source 54 attached to the internal surface 26 of the distal housing 22.

With reference back to FIG. 2, the sensor assembly 50 further includes a frame 70 having a curved base wall 72 that is complementary in shape and configuration to the internal surface 26 of the distal housing 22. The frame 70 connects to the distal housing 22 and contacts the inner surface 26 of the distal housing. The frame 70 includes a first light source receptacle 74, a second light source receptacle 76, and a camera receptacle 78. The first light source receptacle 74 receives the first light source 52, which fixes the location of the first light source 52 with respect to the rotational axis 34 and the distal opening 24. Similarly, the second light source receptacle 76 receives second light source 54, which fixes the location of a second light source 54 with respect to the rotational axis 34 and the distal opening 24. Also, the camera receptacle 78 receives the camera 56, which fixes the location of the photosensitive array 60 (FIG. 1) with respect to the rotational axis 34 and a distal opening 24.

Figure 3:
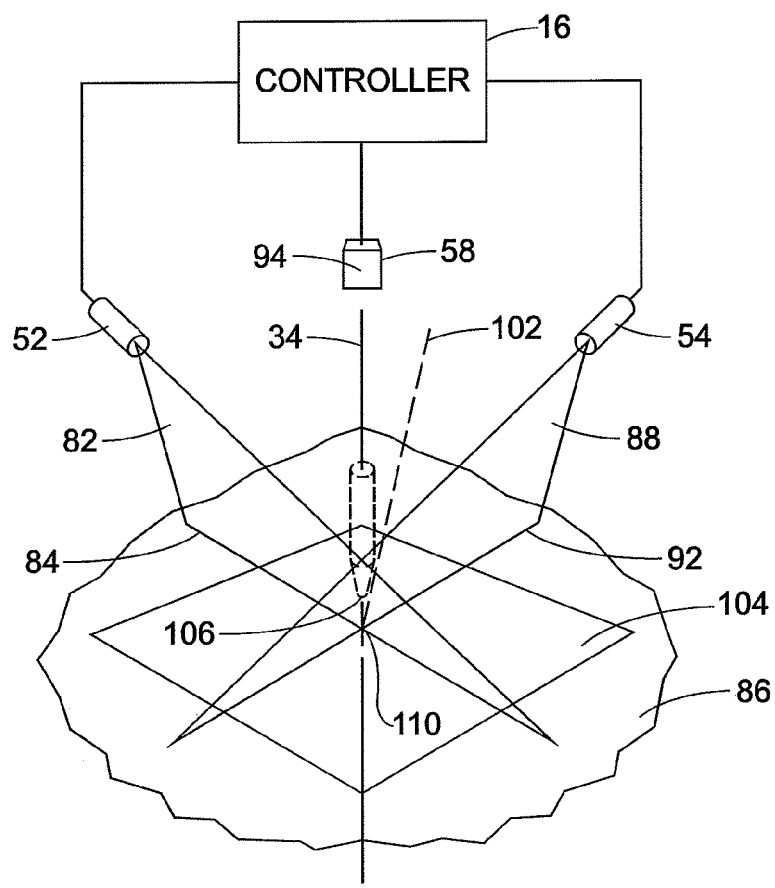
FIG. 3 is a schematic depiction of components of a sensor assembly of the end effector depicted in FIG. 1.

With reference to FIG. 3, the first light source 52 is configured to produce a first fan of light 82, which is projected as a first line of light 84 on an object surface 86 of a work piece. The work piece is the manufactured component that is being operated on by the industrial robot. The second light source 54 is configured to produce a second fan of light 88, which is projected as a second line of light 92 on the object surface 86. The first fan of light 82 resides in a first plane, and the second fan of light 88 resides in a second plane that is offset at an angle transverse to the first plane. As illustrated in FIG. 3, the first plane is perpendicular to the second plane such that the first light of line 84 is perpendicular to the second line of light 92. The first line of light 84 need not be perpendicular to the second line of light 92. Each of the first light source 52 and the second light source 54 is a structured light source capable of producing the aforementioned fans of light. Lasers and/or linear LEDs are preferred. Other light sources that can produce the desired lines on the object surface can also be used.

In the illustrated embodiment, the first light source 52 is positioned with respect to the distal opening 24 (FIG. 1) such that the first fan of light 82 is projected through the distal opening 24. Similarly, the second light source 54 is positioned with respect to the distal opening 24 such that the second fan of light 88 is projected through the distal opening. Also, the photosensitive array 60 is positioned with respect to the distal opening 24 such that light reflected from the first line of light 84 and the second line of light 92 passes through the distal opening 24 en route to the photosensitive array 60.

As depicted in FIGS. 1 and 2, the sensor assembly 50 is located within the hollow distal housing 22. If desired, the sensor assembly 50 or components thereof could be located external of the distal housing 22, for example, by mounting to the external surface 28 of the distal housing. Positioning of the sensor assembly 50 in the end effector 10 and/or adjacent the rotational axis 34 and the distal opening 24 obviates the need for the robot system to move a camera to a nominal location to obtain an image of the work surface and then move a drill bit back to the nominal location to perform the working operation. The sensor assembly 50, which obtains images of the object surface 86 (FIG. 3,) is near enough the rotational axis that the number of movements of the robot arm 12 is reduced.

With reference back to FIG. 3, the first light source 52 is positioned with respect to the rotational axis 34 and the second light source 54 is positioned with respect to the rotational axis 34 and the first light source 52 such that the first fan of light 82 intersects the second fan of light 88 along the rotational axis 34. As mentioned above, the first light source 52 is positioned with respect to the second light source 54 such that the first fan of light 82 is perpendicular to the second fan of light 88; however, such a configuration is not necessary. The first light source 52 is offset from a center point 94 of the photosensitive array 60 at angle A. The second light source 54 is offset from the center point 94 of the photosensitive array 60 at angle B. In the illustrated embodiment, angle A is equal in magnitude but opposite in direction from angle B.

The controller 16 is configured to receive a signal from the sensor assembly 50. The controller 16 measures normalcy of the rotational axis 34 with respect to the object surface 86. The controller 16 operates the drive assembly 14 to adjust the robot arm 12 based on the measured normalcy of the rotational axis 34 with respect to the object surface. The controller determines $R_x$ and $R_y$ of the rotational axis 34 with respect to a z-axis 102, which is normal to an x-y plane 104 on the object surface 86 where the x-y plane 104 is normal to the z-axis. $R_x$ is an angle between the rotational axis 34 and the z-axis 102 in an x-direction. $R_y$ is an angle between the rotational axis 34 and the z-axis 102 in a y-direction.

Figure 4:
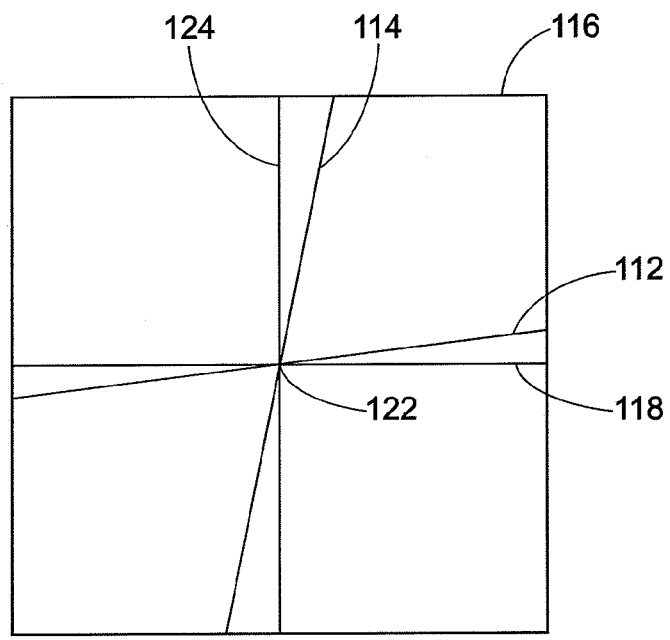
FIG. 4 is a schematic depiction of an image captured by a photosensitive array of the end effector depicted in FIG. 1.

With reference to FIG. 4, the controller determines $R_x$ and $R_y$ based on a first reflection line 112 detected by the photosensitive array 60 and a second reflection line 114 detected by the photosensitive array. FIG. 4 depicts an image 116 captured by the photosensitive array 60. The image 116 can be displayed on a conventional display (not shown) that is in communication with the controller 16. The photosensitive array 60 can be a conventional CCD sensor having a photosensitive array matrix that can resolve the received image into a plurality of pixels to allow for calculations in an x, y and z-coordinate system. In the illustrated embodiment, the first light source 52 is configured with respect to the second light source 54 and the rotational axis 34 such that the first line of light 84 and the second line of light 92 are disposed perpendicular to one another. Due to this configuration, if the rotational axis 34 were normal to the object surface 86 (such that the rotational axis 34 is coincident with the z-axis 102 in FIG. 3) then the first reflection line 112 would be perpendicular to the second reflection line 114. The angular offset that the first reflection line 112 is off from a horizontal line 118 through an intersection point 122 for the first reflection line 112 and the second reflection line 114 correlates to R. The angular offset that the second reflection line 114 is offset from a vertical line 124 that also intersects the intersection point 122 correlates to $R_y$. These angles can be fed to the controller 16 which can in turn operate the drive assembly 14 to maneuver the robot arm 12 to correct for the offset of normalcy of the rotational axis 34 with respect to the x-y plane 104 on the object surface 86.

The controller 16 also determines x, y and z-coordinates for a point 130 on the rotational axis 34 with respect to the x-y plane and the z-axis. The point 130 can be a distal end of the drill bit 38 when the drill bit is in the retracted position, which is shown in FIG. 1. The center point 94 on the photosensitive array 60 is offset from the point 130 on the rotational axis 34 a predetermined distance $d_z$ measured parallel to the rotational axis 34. The center point 94 is also offset from the point 130 on the rotational axis 34 a predetermined distance $d_x$ measured in the x-direction, and is offset from the point 130 a predetermined distance $d_y$ measured in the y-direction. Also, the orientation of the photosensitive array 60 with respect to the first fan of light 82 and the second fan of light 88 is known. These known relationships allow for the location of the point 130 on the robot arm 12 with respect to the x-y plane and the z-axis based on known trigonometric equations and the type (size) of CCD array used for the photosensitive array 60.

Figure 5:
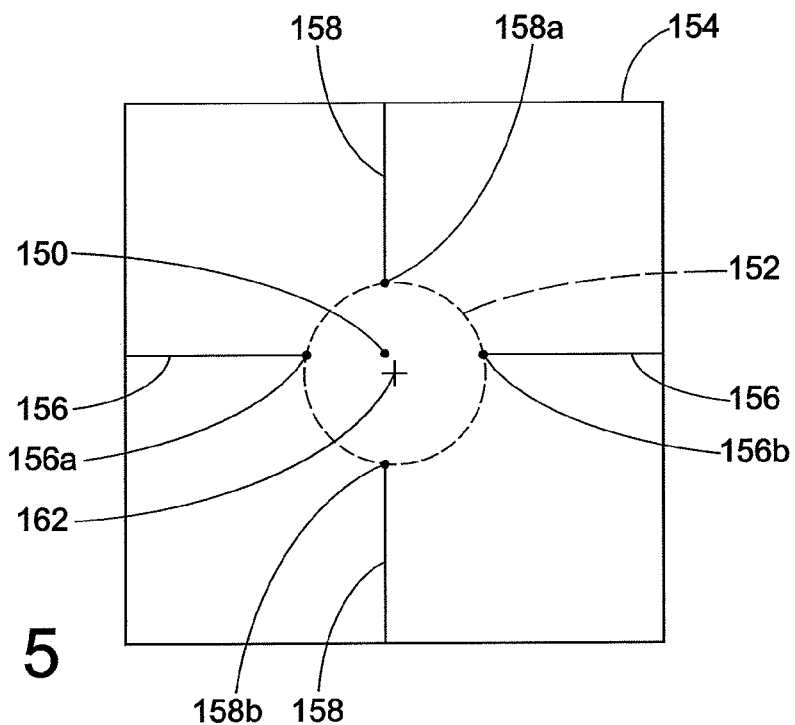
FIG. 5 is another schematic depiction of an image captured by the photosensitive array of the end effector depicted in FIG. 1.

In operation, the point 130 on the robot arm 12 is moved adjacent to a nominal location within the robot frame. Movement of the robot arm 12 toward the nominal location can be performed by the controller 16 providing signals to the drive assembly 14 to drive the robot arm to a known location, which is the nominal location. With reference to FIG. 3, the nominal location can be where the point 130 on the robot arm 12 is aligned with a point on the object surface 86 but offset in a z-direction a minimal distance from the x-y plane 104. With reference to FIG. 5, the x and y coordinates of the nominal location could correspond to what is thought to be a center (hereinafter "nominal center") 150 of a circular hole 152 formed in the object surface. FIG. 5 depicts an image 154 captured by the photosensitive array 60 when the rotational axis 34 is normal to the x-y plane 104 on the object surface 86. FIG. 5 depicts the circular hole 152 with dashed lines. The circular hole 152 would not be visible in the captured image 154, but is shown for the sake of clarity. With the point 130 (FIG. 1) on the robot arm 12 moved to the nominal location, and the normalcy of the rotational axis 34 being within a predetermined tolerance (so that the rotational axis 34 can be assumed to be normal to the x-y plane 104), the x, y and z-coordinates for the point 130 on the robot 12 can be determined due to the known nominal location. The normalcy of the rotational axis 34 with respect to the x-y plane 104 can be determined as described above.

With the point 130 on the robot arm 12 positioned at the nominal center 150, a first line of light similar to the first line of light 84 shown in FIG. 3 is projected onto the object surface 86. A first reflection line 156 is detected by the photosensitive array 60, which corresponds to a first line of light. With the point 130 on the robot arm 12 positioned at the nominal center 150, a second line of light similar to the second line of light 92 shown in FIG. 3 is projected onto the object surface 86. A second reflection line 158 is detected by the photosensitive array 60, which corresponds to a second line of light. Since the rotational axis 34 (FIG. 1) is normal to the x-y plane 104 (FIG. 3), the first reflection line 156 is perpendicular to the second reflection line 158 and the first reflection line 156 would intersect the second reflection line 158 if the hole was not in the work surface 86 (FIG. 3).

Since there is the hole (denoted by the circle 152 in FIG. 5) in the work surface 86, there will be a break in the first reflection line 156 and the second reflection line 158. Accordingly, four points, e.g., break points 156a, 156b, 158a and 158b, for the hole 152 are known. Since the hole 152 is circular, curve fitting and/or least square analysis can be used to determine the periphery of the hole. With the periphery of the circular hole 152 known, the true center 162 of the circular hole 152 can be determined and the offset between the nominal center 150, i.e. what was thought to be the center of the hole 152, and the true center 162 of the hole 152 can be determined based on the number of pixels between nominal center 150 and the true center 162 in the x and y directions.

If the rotational axis 34 aligns with the true center 162 of the hole 152 and is normal to the x-y plane 104, the controller 16 can deliver a signal to the spindle assembly 32 (FIG. 1) to rotate and translate the drill bit 38 (FIG. 1) to drill into the hole with the drill bit. If the rotational axis 34 is not aligned with the true center 162 of the hole 152 or is not normal to the x-y plane 104, then the controller 16 sends a signal to the drive assembly 14 to move the robot arm 12 and then repeat the detecting of the center of the hole and checking to see whether the rotational axis aligns with the true center and is normal to the x-y plane until each of these conditions are satisfied. As such, the robot arm 12 can bring the drill bit 38 into proper location with respect to a pre-drilled hole and drill out the hole normal to the object surface of the work piece. The first line of light and the second line of light, which are similar to the first line of light 84 and the second line of light 92 respectively in FIG. 3, can be projected onto the object surface 86 (FIG. 3) without moving the point 130 on the robot arm 12 from adjacent the nominal location, i.e., the nominal center 150. The increases the speed and accuracy of the system as compared to known robot systems.

Figure 6:
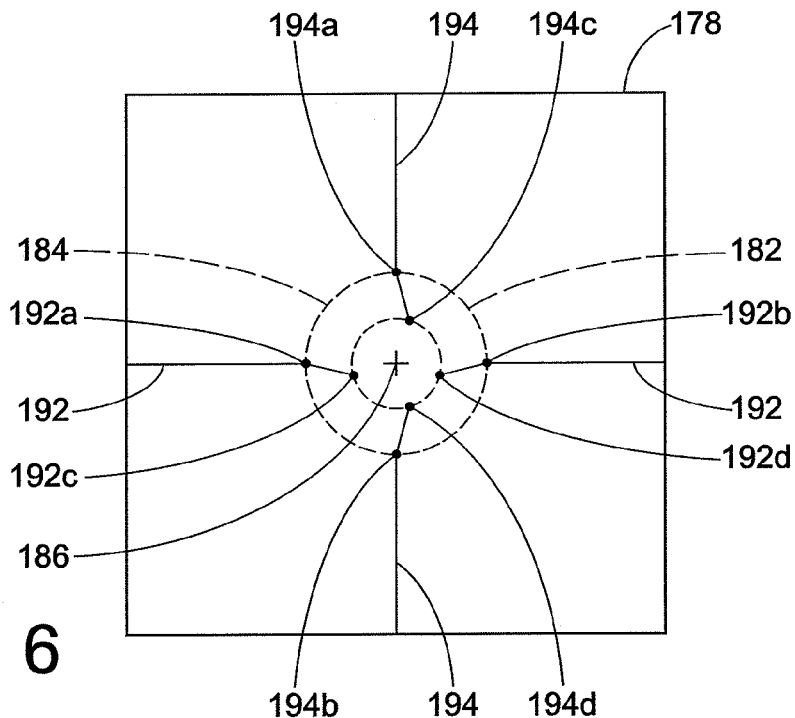
FIG. 6 is another schematic depiction of an image captured by the photosensitive array of the end effector depicted in FIG. 1

The robot arm 12 and the drill bit 38 can also be used to drill a counterbore into the work surface 86. With reference to FIG. 5, when the rotational axis 34 aligns with the true center 162 of the hole 152 and is normal to the x-y plane 104, the controller 16 can deliver a signal to the spindle assembly 32 (FIG. 1) to rotate and translate the drill bit 38 (FIG. 1) to drill a counterbore into the hole with the drill bit. FIG. 6 depicts an image 178 captured by the photosensitive array 60 of a counterbore formed in the object surface 86. The counterbore has an outer diameter (OD) 182 and an inner diameter (ID) 184. FIG. 6 depicts the image 178 captured when the rotational axis 34 is normal to the x-y plane 104 (FIG. 3) on the object surface 86 (FIG. 3). FIG. 6 depicts the OD 182 and the ID 184 with dashed lines. The OD 182 and the ID 184 would not be visible in the captured image 178, but is shown for the sake of clarity. With the point 130 on the robot arm 12 positioned at a center 186 of the OD 182 and the ID 184 and normal to the x-y plane 104, a first line of light similar to the first line of light 84 shown in FIG. 3 is projected onto the object surface 86. A first reflection line 192 is detected by the photosensitive array 60, which corresponds to a first line of light. With the point 130 on the robot arm 12 positioned at the center 186 of the OD 182 and the ID 184 and normal to the x-y plane 104, a second line of light similar to the second line of light 92 shown in FIG. 3 is projected onto the object surface 86. A second reflection line 194 is detected by the photosensitive array 60, which corresponds to a second line of light.

The first reflection line 192 changes direction at the OD 182 at points 192a and 192b. This is due to the change in the z-direction between the OD 182 and the ID 184 of the counterbore. The first reflection line 192 breaks at points 192c and 192d on the ID 184. Similarly, the second reflection line 194 changes direction at the OD 182 at points 194a and 194b. . The second reflection line 194 breaks at points 194c and 194d on the ID 184. Similar curve fitting and least squares analysis can be performed to determine the respective ID 184 and OD 182 based on these lines of reflection. The diameter of the OD 182 and the ID 184 can be measured based on the curve fitting and least squares analysis. The depth of the counterbore in the z-direction can be determined based on the change in direction of the first line of reflection 192 at the OD 182 and based on the change in direction of the second line of reflection 194 at the OD.

The nominal location can also provide a datum point for the robot. In such an instance, the nominal location is typically one of a plurality of nominal locations each corresponding to a respective hole or fastener in the object surface 86. A center of the first hole or fastener at a first nominal location is detected in a manner similar to the detection of the true center 162 of the hole 152 described above with reference to FIG. 5. If the rotational axis 34 is normal to the x-y plane 104 (FIG. 3), then the controller 16 calculates and records the x, y and z-coordinates for the true center 162 with respect to the nominal center 150. If the rotational axis 34 is not normal to the x-y plane 104 (FIG. 3), then the robot arm 12 is moved and the detecting of the center of the holes and checking to see if the rotational axis is normal to the x-y plane is repeated. Once the true center 162 is detected, the x, y and z-coordinates are recorded and the point 130 on the robot arm 12 moves to the next nominal location and repeats these steps. Once the robot system has repeated the steps at at least three different nominal locations, the entire robot frame can then be shifted based on the offset of the nominal locations from the true locations. With the robot frame shifted in the Cartesian coordinates, the robot arm could then be moved to other desired locations and other holes and other holes can be drilled into the work surface.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for controlling an industrial robot comprising:
    moving a point on a robot arm adjacent to a nominal location within a robot frame, wherein the robot arm includes a drill bit rotatable about a rotational axis; and
    determining x, y and z-coordinates, and $R_x$ and $R_y$ of the point on the robot arm with respect to an x-y plane defined by an object surface, wherein a z-axis is normal to the x-y plane, wherein $R_x$ is a first angle between the rotational axis and the z-axis in an x-direction and $R_y$ is a second angle between the rotational axis and the z-axis in a y-direction,
    wherein determining the x, y and z-coordinates, and $R_x$ and $R_y$ of the point on the robot arm further includes
        projecting a first line of light from a first light source onto the object surface without moving the point on the robot arm from adjacent the nominal location;
        projecting a second line of light from a second light source, which is offset from the first light source, onto the object surface without moving the point on the robot arm from adjacent the nominal location, wherein the second line of light intersects the first line of light at an intersection point on the object plane where the rotational axis intersects the object plane;
        detecting a reflection of the first line of light on a photosensitive array offset from the first light source and the second light source to generate a first reflection line;
        detecting a reflection of the second line of light on a photosensitive array offset from the first light source and the second light source to generate a second reflection line; and
        calculating the x, y and z-coordinates, and $R_x$ and $R_y$ of the point on the robot arm based on the intersection point and an angle between the first reflection line and the second reflection line.

2. The method of claim 1, wherein the nominal location corresponds to a hole in the object surface, the method further comprising:
    (a) detecting a center of the hole based on a change in direction or break in the first reflection line and the second reflection line;
    (b) if the rotational axis aligns with the center of the hole and is normal to the x-y plane, drilling into the hole with the drill bit,
    (c) if the rotational axis is not aligned with the center of the hole or is not normal to the x-y plane, then moving the robot arm and repeating steps (a) and (b).

3. The method of claim 2, wherein detecting the center of the hole further includes performing a curve fitting or least squares analysis based on break points in the first reflection line and the second reflection line.

4. The method of claim 1, wherein the nominal location is one of a plurality of nominal locations each corresponding to a respective hole or a fastener in the object surface, the method further comprising:
    (a) detecting a center of a first hole or fastener at a first nominal location of the plurality of nominal locations based on a change in direction or break in the first reflection and the second reflection line;
    (b) if the rotational axis is normal to the x-y plane, calculating and recording the x, y and z-coordinates for the center,
    (c) if the rotational axis is not normal to the x-y plane, then moving the robot arm and repeating steps (a) and (b).

* * * * *